US010848254B2

(12) United States Patent
Patwardhan et al.

(10) Patent No.: US 10,848,254 B2
(45) Date of Patent: Nov. 24, 2020

(54) ENHANCED CHANNEL ACCESS IN 802.11AX USING SRG FOR FOREIGN APS

(71) Applicant: Hewlett Packard Enterprise Development LP, Houston, TX (US)

(72) Inventors: Gaurav Patwardhan, Santa Clara, CA (US); Sachin Ganu, San Jose, CA (US); Eldad Perahia, Park City, UT (US); Dongwoon Hahn, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 38 days.

(21) Appl. No.: 16/124,875

(22) Filed: Sep. 7, 2018

(65) Prior Publication Data
US 2020/0083969 A1 Mar. 12, 2020

(51) Int. Cl.
*H04W 48/16* (2009.01)
*H04B 17/318* (2015.01)
*H04L 1/16* (2006.01)
*H04W 84/12* (2009.01)

(52) U.S. Cl.
CPC ......... *H04B 17/318* (2015.01); *H04L 1/1614* (2013.01); *H04W 48/16* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,820,162 B2 | 11/2017 | Wang et al. | |
| 2015/0036662 A1 | 2/2015 | Chen et al. | |
| 2015/0139031 A1* | 5/2015 | Kang | H04W 16/10 370/254 |
| 2016/0066257 A1 | 3/2016 | Liu et al. | |
| 2016/0345258 A1 | 11/2016 | Zhou et al. | |
| 2016/0374087 A1 | 12/2016 | Liu et al. | |
| 2017/0255659 A1 | 9/2017 | Cariou et al. | |
| 2017/0303311 A1 | 10/2017 | Chu et al. | |

(Continued)

FOREIGN PATENT DOCUMENTS

WO 2016/112306 A1 7/2016

OTHER PUBLICATIONS

What Is BSS Coloring In 802.11ax?, (Research Paper), Mar. 6, 2018, 6 Pgs.

(Continued)

*Primary Examiner* — Phuongchau Ba Nguyen
(74) *Attorney, Agent, or Firm* — Sheppard Mullin Richter & Hampton LLP

(57) ABSTRACT

Systems and methods for spatial reuse in a deployed wireless area network (WLAN) include identifying a plurality of competing APs of an external wireless network operating on a same channel as a deployed AP of a deployed wireless network; examining the received signal strength indicator (RSSI) of the identified plurality of competing APs of the external wireless network; filtering out selected one or more of the identified plurality of competing APs of the external wireless network based on their respective RSSIs to arrive at a filtered set of competing APs; and augmenting a spatial reuse group (SRG) of the deployed AP to include the APs in the filtered set of competing APs in the SRG.

16 Claims, 6 Drawing Sheets

(56) References Cited

U.S. PATENT DOCUMENTS

| | | |
|---|---|---|
| 2018/0020478 A1 | 1/2018 | Derham et al. |
| 2018/0063718 A1 | 3/2018 | Lan et al. |
| 2019/0075469 A1 | 3/2019 | Mahoney et al. |
| 2019/0124542 A1 | 4/2019 | Pandey et al. |
| 2019/0208423 A1* | 7/2019 | Cherian ................ H04W 16/28 |
| 2019/0281608 A1 | 9/2019 | Huang et al. |

OTHER PUBLICATIONS

Extended European Search Report received for EP Patent Application No. 19185407 4, dated Dec. 12, 2019, 05 pages.
Extended European Search Report received for EP Patent Application No. 19194795.1, dated Jan. 24, 2020, 06 pages.
Fischer et al., "CR Spatial Reuse Group Management CID 12044 12304", IEEE, Jan. 18, 2018, vol. 802, pp. 1-15.
Hedayat et al., "Spatial Reuse Group Challenges", IEEE, Mar. 13, 2017, vol. 802, pp. 1-12.

* cited by examiner

| BSSID | RSSI | Color | Mode |
|---|---|---|---|
| 00:00:00:00:00:01 | -52 | 3 | HE |
| 00:00:00:00:00:02 | -62 | - | HT |
| 00:00:00:00:00:03 | -68 | - | VHT |
| 00:00:00:00:00:04 | -72 | - | Legacy |
| 00:00:00:00:00:05 | -82 | 1 | HE |
| 00:00:00:00:00:06 | -92 | - | HT |

Fig. 3

| BSSID | RSSI | Color | Mode |
|---|---|---|---|
| 00:00:00:00:00:02 | -62 | - | HT |
| 00:00:00:00:00:03 | -68 | - | VHT |
| 00:00:00:00:00:04 | -72 | - | Legacy |
| 00:00:00:00:00:05 | -82 | 1 | HE |

ENHANCED CHANNEL ACCESS IN 802.11AX USING SRG FOR FOREIGN APS

DESCRIPTION OF RELATED ART

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The IEEE 802.11 networks have continued to evolve in an attempt to address these challenges. These challenges have been addressed to some extent by introducing Dynamic Sensitivity Control (DSC) and Basic Service Sets (BSS) Color schemes in IEEE 802.11ax and IEEE 802.11ah implementations, respectively. These schemes are intended to improve network throughput and spectrum efficiency in dense environments. Particularly, BSS Coloring was introduced in 802.11ah to increase the network capacity in dense environments by improving the ability to reuse frequencies.

This spatial reuse feature allows two devices existing in different adjoining BSSs in the same frequency channel to transmit simultaneously if certain conditions are met. These conditions are described by using different CCA (Clear Channel Assessment) levels for inter-BSS and intra-BSS frames on the same channel. The distinction between inter and intra-BSS frames is given by the color parameter embedded in the packet by the respective BSS. Depending on the CCA thresholds for inter-BSS vs intra-BSS frames, one AP or device may defer medium access to the other AP or device depending on the BSS where the packet originated. This situation creates a possible scenario where a device would have unbalanced channel access, allowing it to transmit more often than its neighboring device.

Under Spatial Reuse (SR), there is a concept of a spatial reuse group (SRG). This allows systems to classify packets seen at an AP as either packets originating from a certain group of BSSs or packets that originate from all the other BSSs. The concepts of SR and SRGs were introduced in IEEE 802.11ax to help extract more capacity from a deployed wireless LAN. The concept can also provide a higher priority to APs included in an SRG. In other words, if deployed APs are added to the SRG, the system may use spatial reuse with a CCA level higher than that used for APs not in the SRG.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates an example list of competing APs (BSSs) in accordance with one embodiment.

FIG. 4 illustrates an example of a truncated form of the list provided in FIG. 3 in accordance with one embodiment.

FIG. 5 illustrates the SRPS element in accordance with 802.11ax in accordance with one embodiment.

FIG. 6 illustrates the SR control field, including its subfields in accordance with one embodiment.

Figure 1:
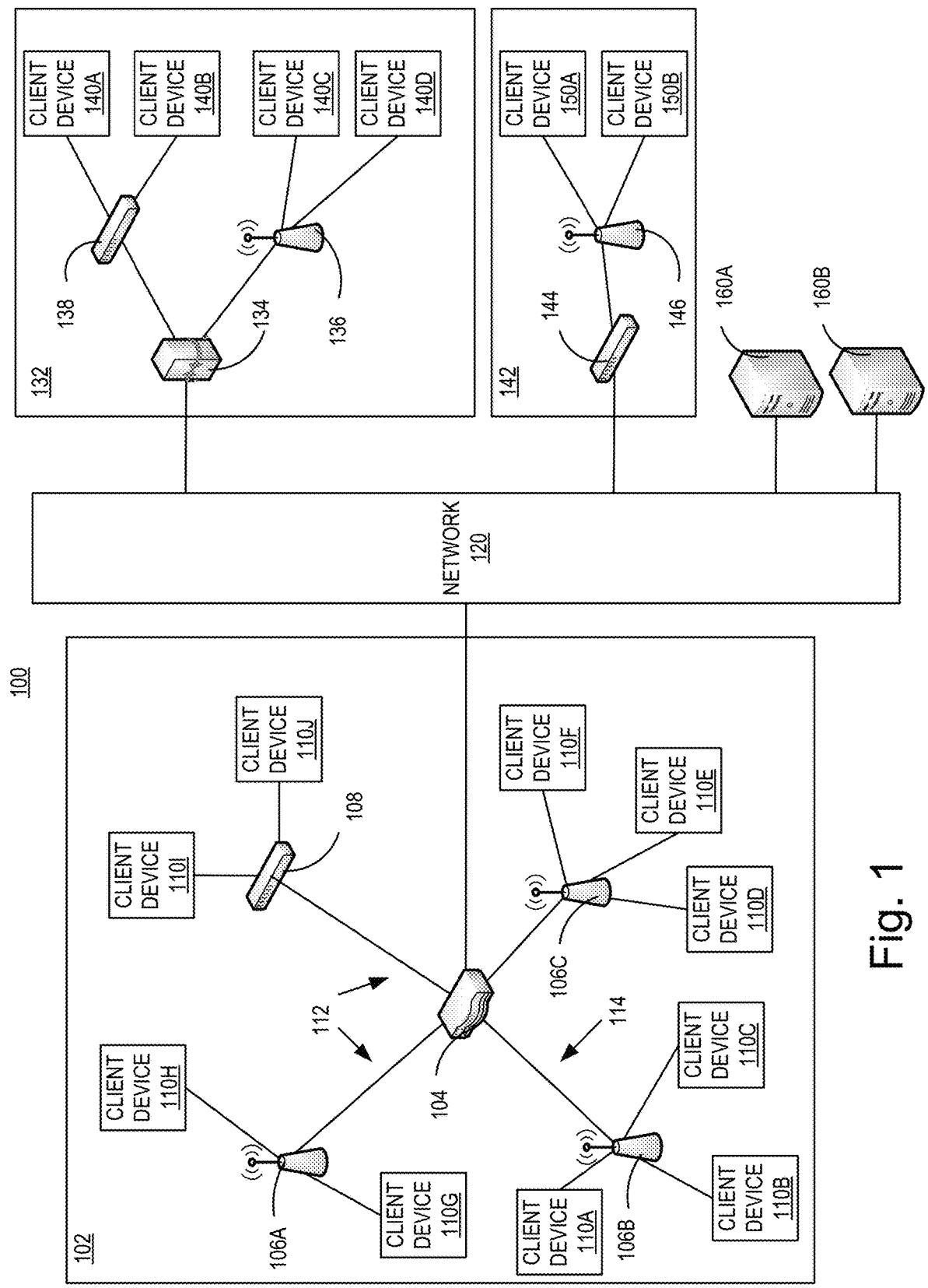
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Implementations of the disclosed technology may include systems and methods to update an SRG of a local wireless network to include competing APs in an external wireless network to improve network capacity.

As described in more detail with reference to FIG. 1, a Wireless Lan (WLAN) may include a plurality of Access Points (APs), as elements of the WLAN. These APs in the deployed network may be referred to as deployed APs for ease of discussion. In addition, nearby, separate, WLANs (which may be referred to as external wireless networks) may include their own APs that could cause interference with, and compete for bandwidth against, the deployed APs of the local wireless network. These external-network APs may be referred to as competing APs for ease of discussion.

Competing APs are defined as the APs present in and around the WLAN deployment (i.e. deployed APs) under consideration and not under the control of the network operator. These competing APs may also use spatial reuse, and coloring may cause operational hindrances by allowing an unbalanced channel access, in which a competing AP assigned a given channel and BSS color is allocated a greater amount of channel time than a deployed AP within its range. This may also create network security issues. For example, assume the competing AP has a CCA level at −62 dBm whereas the deployed APs have their CCA at −82 dBm. This will create an asymmetric channel access based on sensitivity, working in the favor of the competing APs. This channel access problem is especially pronounced in dense deployments. Accordingly, systems and methods disclosed herein may provide a solution to address the problem of unbalanced channel access when the APs in the deployment and the competing APs are 11ax capable and are operating on the same channel (i.e. they are co-channel).

As noted above, a wireless LAN deployment may see and be impacted by many competing APs in other networks. If only deployed APs were added to the SRG, the result would be a deployed AP deferring to another deployed AP at a higher CCA level and possibly deferring to a competing AP at a lower CCA level. This would generally cause the deployed AP to be more sensitive to the competing AP. This could cause a channel access inversion in which the deployed APs channel access is less than it would otherwise be as a result of the presence of the competing APs.

In various embodiments, competing APs seen by a deployed AP can be added to the deployed AP's SRG, and the SRG-based overlapping BSS (OBSS) minimum and maximum thresholds may be changed to a value higher than the maximum threshold for the Non-SRG OBSS power detect (PD) level. This may have the effect of raising the effective minimum threshold required for the deployed AP to detect a packet originating from the competing AP relative to other deployed APs. In other words, the deployed AP may become less sensitive to competing APs as compared to other deployed APs within the deployed network. As a result, the capacity of the deployed network may be increased.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Although 10 client devices 110a-j, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time. As noted above, various IEEE 802.11 networks may implement what is referred to as BSS coloring to increase network capacity in such dense environments. This can allow improvement and frequency reuse among network devices.

Figure 2:
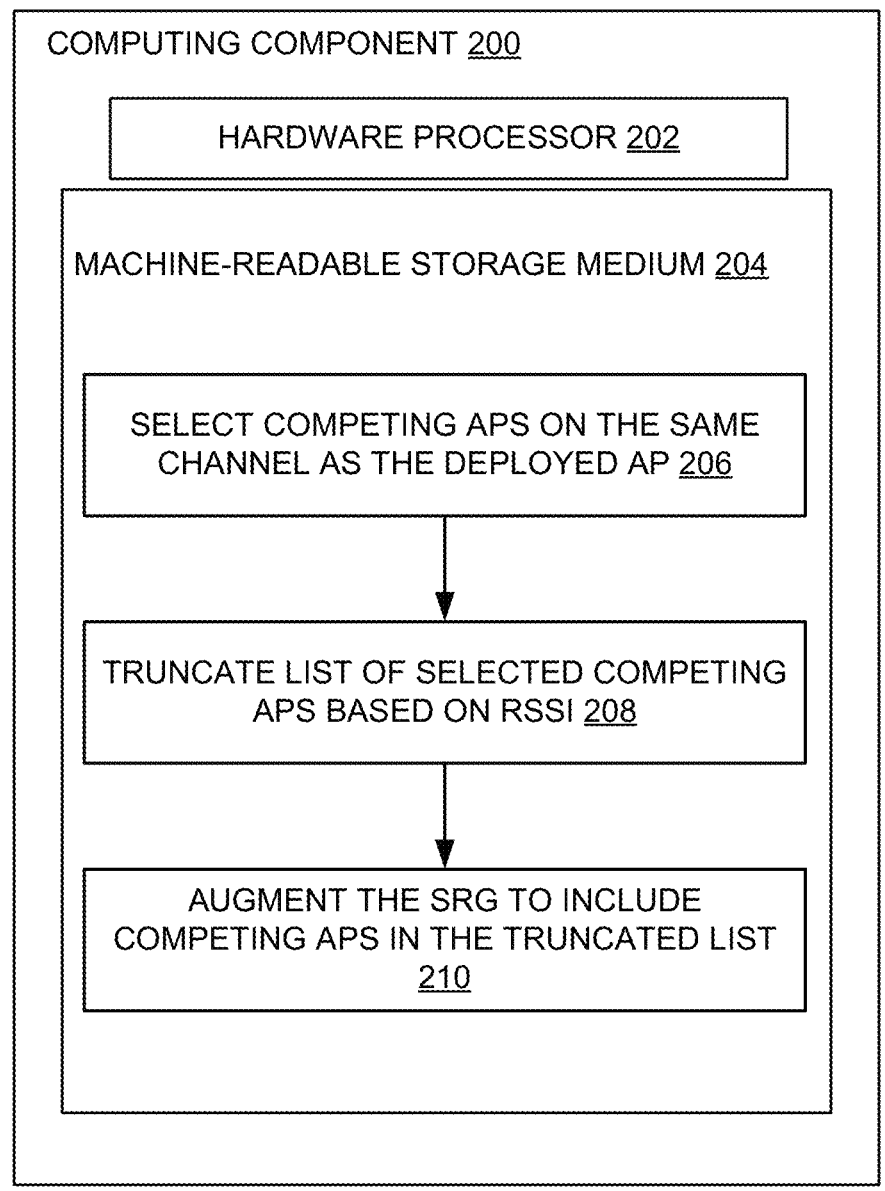
FIG. 2 is a block diagram of an example computing component for adding competing APs to an SRG in accordance with one embodiment.

FIG. 2 is a block diagram of an example computing component 200 for adding competing APs to the SRG in accordance with one embodiment. Computing component 200, hardware processor 202, and machine-readable storage medium 204 as depicted in FIG. 2 may be the same as that illustrated in FIG. 2 or similar thereto. Hardware processor 200 of the controller may execute instruction 206 to select competing APs on the same channel as the deployed AP.

In some embodiments, this may be accomplished by the deployed AP creating a list of competing APs (BSSs) on the same channel. For example, the deployed AP may listen to various frames, including beacons, on the channel. As noted above, the color of the competing APs can be determined in various network implementations by IEs in the Beacon as well other packet information. For example, in various 802.11 deployments, this can be determined by the BSS_COLOR field from the HE-SIG-A field in the PHY header. Similarly, the operating mode of the radio can be determined such as from a PHY header, Beacon IEs, and other frames. For example, the operating mode may be determined as Legacy (802.11 a/b/g), HT (802.11n), VHT (802.11ac) or HE (802.11ax), etc.

FIG. 3 illustrates an example list of competing APs (BSSs). This example list 6 sample competing APs, their respective RSSIs, Colors and Modes. As seen in this example, the RSSI ranges from −92 dBm to −52 dBm, with modes including HE, HT, VHT and Legacy.

Figures 5, 6:
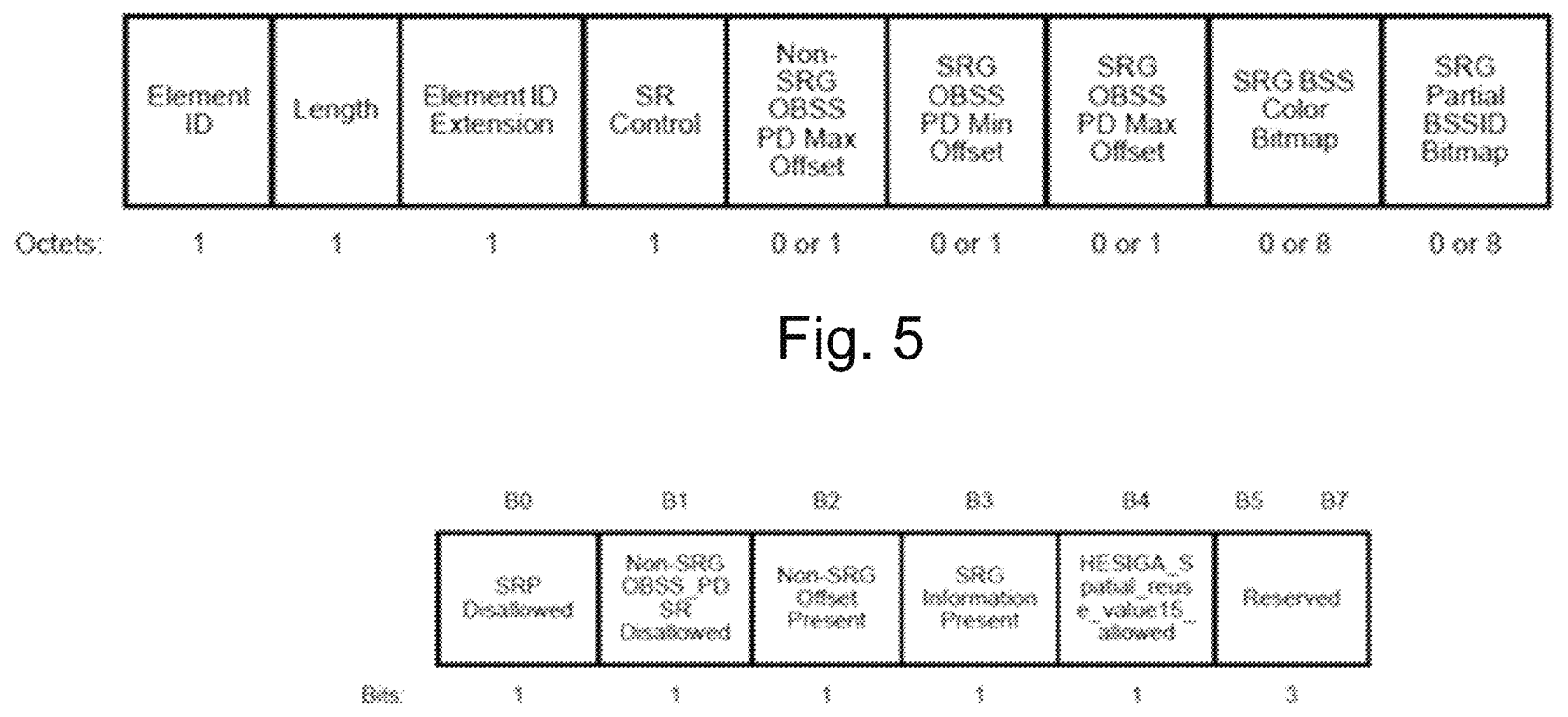

Hardware processor 200 of the controller may execute instruction 208 to truncate the list based on RSSI. This can be performed to remove a piece that fall outside of a determined range. For example, APs outside of the operational range of the network's spatial reuse can be removed. FIG. 4 illustrates an example of a truncated form of the list provided in FIG. 3. In this example, all APs falling outside of the range from −82 dBm to −62 dBm have been removed so that the table only has entries for APs with an RSSI>=−62 dBm and <=−82 dBm Hardware processor 200 of the controller may execute instruction 210 to augment the SRG to include the remaining competing APs on the list. In terms of the example illustrated in FIG. 4, competing APs with the BSSIDs 00:00:00:00:00:02, 00:00:00:00:00:03, 00:00:00:00:00:04 and 00:00:00:00:00:05 are added to the SRG. Where a deployed AP is 11ax capable (HE), it has a Spatial Reuse Parameter Set (SRPS) element as an IE in the management frame. FIG. 5 illustrates the SRPS element in accordance with 802.11ax. FIG. 6 illustrates the SR control field, including its subfields.

For a deployed AP under consideration, APs included under a SRG for that deployed AP, follow different set of CCA threshold limits as compared to APs not included in the SRG. Table 1, from IEEE 802.11ax draft 3.0, sets forth an example of minimum and maximum power detect threshold limits ("Non-SRG_OBSS_PD_min" and "Non-SRG_OBSS_PD_max") for non-SRG APs when measured at the deployed AP under consideration.

TABLE 1

Minimum and Maximum Power Detect Threshold Limits for non-SRG APs

| Non SRG OBSS_PD SR Disallowed field in Spatial Reuse Parameter Set element | Non-SRG Offset Present field in Spatial Reuse Parameter Set element | Value of Non-SRG OBSS PD Min | Value of Non-SRG OBSS PD Max |
|---|---|---|---|
| Not applicable if the Spatial Reuse Parameter Set element is not received | Not applicable if the Spatial Reuse Parameter Set element is not received | −82 | −62 |
| 0 | 0 | −82 | −62 |
| 0 | 1 | −82 | −62 |
| 0 | 1 | −82 | −82 + Non-SRG OBSS PD Max Offset |
| 1 | Don't care | −82 | −82 |

Table 2, also from IEEE 802.11ax draft 3.0 sets forth an example of minimum and maximum power detect threshold limit for the APs considered under the SRG ("SRG_OBSS_PD_min" and "SRG_OBSS_PD_max").

TABLE 2

Minimum and Maximum Power Detect Threshold Limits for APs under an SRG

| SRG Information Present field in Spatial Reuse Parameter Set element | Value of SRG OBSS PD Min | Value of SRG OBSS PD Max |
|---|---|---|
| Not applicable if the Spatial Reuse Parameter Set element is not received | N/A see NOTE | N/A see NOTE |
| 0 | N/A see NOTE | N/A see NOTE |
| 1 | −82 + SRG OBSS PD Min Offset | −82 + SRG OBSS PD Max Offset |

NOTE -
When SRG Information is not present, a STA cannot determine a PPDU to be SRG and so will not use SRG OBSS PD Min or SRG OBSS PD Max values.

Figure 7:
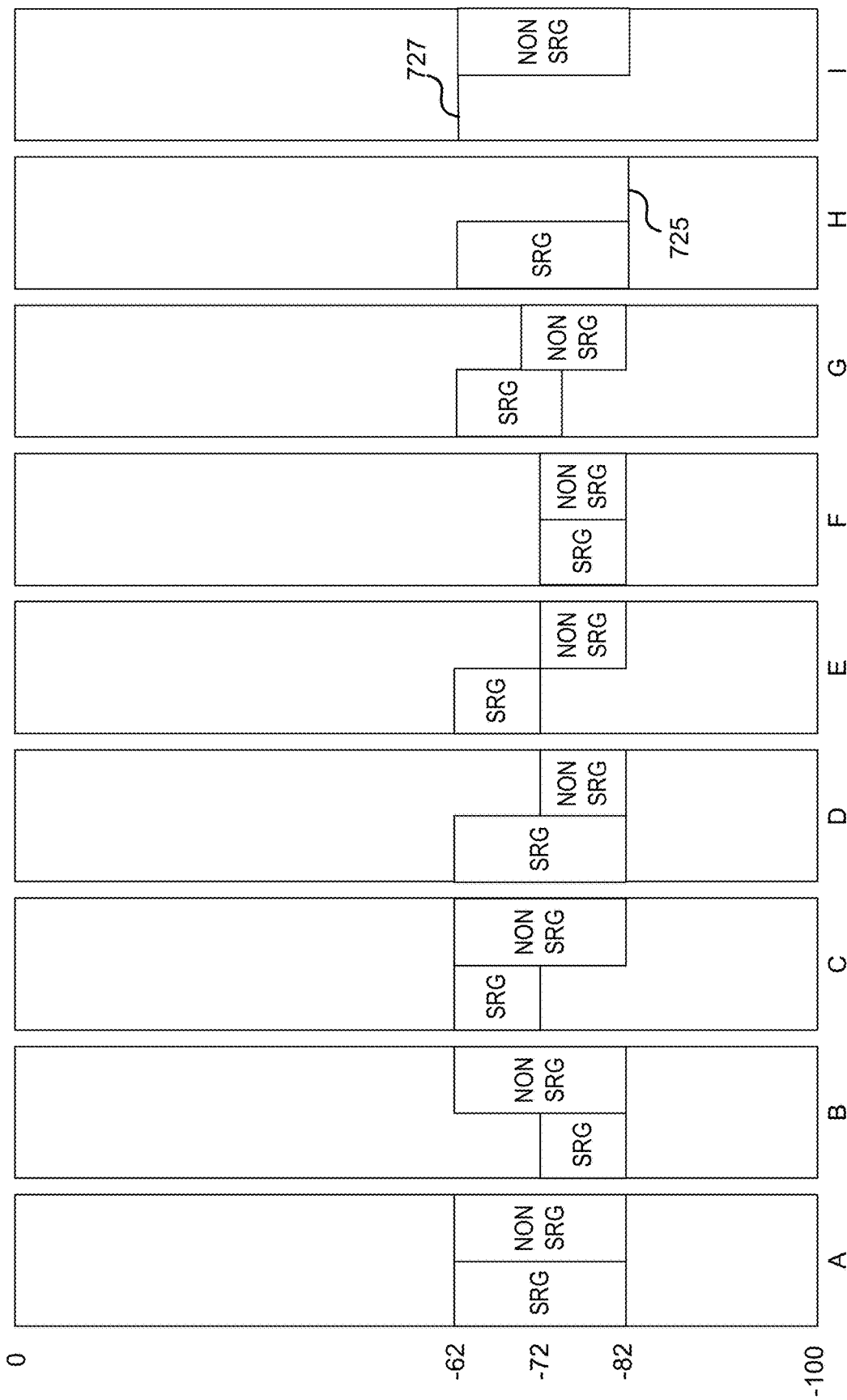
FIG. 7 illustrates eight possible scenarios, A-I, based on minimum and maximum values for the OBSS PDs in accordance with one embodiment.

Based on Table 1 and Table 2, different scenarios may exist for the possible values of "Non-SRG_OBSS_PD_min", "Non-SRG_OBSS_PD_max", "SRG_OBSS_PD_min" and "SRG_OBSS_PD_max". FIG. 7 illustrates eight possible scenarios, A-I, based on minimum and maximum values for the OBSS PDs. FIG. 7 shows the range values for SRG and Non-SRG detection (in RSSI) in each of the eight scenarios. In Scenario H, 725 illustrates that the maximum and minimum range values for Non-SRG APs are the same. In Scenario I, 727 illustrates that the maximum and minimum range values for SRG APs are the same. With standard SRG deployment, all APs may be classified as non-SRG by default. Accordingly, in this environment a deployed AP must add an AP to its SRG for that AP to be classified as an SRG AP. This means that the SRG APs may be considered to be a special case of APs, and all the other APs are considered to be the default case. Also, as shown in the examples of Table 1 and Table 2, above, the Non-SRG_OBSS_PD_min is always at −82 dBm but the SRG_OBSS_PD_min can be changed to any value from −82 dBm to −62 dBm. This means that the deployed AP may be made less sensitive to the ongoing traffic of the APs added in the SRG in various embodiments.

Referring still to FIG. 7, scenarios B, E, G and I would benefit from adding the competing APs to the SRG. In these scenarios, the AP would be less sensitive to the competing APs as compared to Non-SRG APs. In scenarios B, E and G, at least where there is a matching color with the competing AP, the deployed AP will defer channel access if the received packet is within the possible range of RSSI thresholds. In contrast, in scenario I the deployed AP won't consider the competing AP's color at all. The competing AP may possibly have its power detect thresholds at −82 dBm in which case all the scenarios (B, E, G and I) would benefit in terms of channel access. If the competing AP has its power detect threshold level at higher level (say −72 dBm or −62 dBm), then only scenario "I" would benefit. Accordingly, some solutions operating in accordance with this example may set the SRG based OBSS PD minimum and maximum thresholds to −62 dBm.

In various implementations, flags in the SR Control field may have the appropriate values to allow SRG operation. For example, in scenario "I" shown in FIG. 7, the values in the SRPS Element may be set as in Table 3:

TABLE 3

SRPS Element Values for Scenario I

Non-SRG OBSS PD Max Offset = 0 (implies => −82 dBm + 0 = −82 dBm threshold)
SRG OBSS PD Min Offset = 20 (implies => −82 dBm + 20 = −62 dBm threshold)
SRG OBSS PD Max Offset = 20 (implies => -82 dBm + 20 = −62 dBm threshold)

As another example, for scenario "B" shown in FIG. 7, the values in the SRPS Element may be set as in Table 4:

TABLE 3

SRPS Element Values for Scenario B

Non-SRG OBSS PD Max Offset = 20 (implies => −82 dBm + 20 = −62 dBm threshold)
SRG OBSS PD Min Offset = 20 (implies => −82 dBm + 20 = −62 dBm threshold)
SRG OBSS PD Max Offset = 20 (implies => −82 dBm + 20 = −62 dBm threshold)

Accordingly, in scenario "I" of this example, all the deployed AP's are deferred at −82 dBm CCA, whereas for scenario "B" of this example, all of the deployed APs are deferred from −62 dBm to −82 dBm CCA (with coloring and spatial reuse enabled).

Consequently, the deployed AP has the requisite PD thresholds set to take advantage of better channel access. The process for adding APs to the SR G may vary depending on whether the competing AP is a Legacy, HT, VHT OR HE AP. Examples of a process for adding these are now described.

For 802.11ax or HE competing APs, the SRG BSS Color Bitmap subfield is populated in the SRPS element by the deployed AP. It is a bitmap that indicates which BSS Color values are used by members of the SRG. Because the deployed AP knows the colors of the competing APs (via Step 1), it can enable the bits in the bitmap. This allows the STAs associated to the AP to select the competing 802.11ax APs as part of the SRG and apply the PD thresholds.

For 802.11ac or VHT competing APs, the SRG Partial BSSID Bitmap subfield is populated in the SRPS element by the deployed AP. This is a bitmap that indicates which Partial BSSID values are used by members of the SRG. Each bit of the bitmap corresponds to one of the 2" possible values of the BSSID [39:44]. The deployed AP sets the bit in the bitmap at the position given by the numerical value of BSSID [39:44]. This value also corresponds to the Partial_AID subfield in the RXVECTOR field in the PHY header given by the 802.11ac standard. When the STA associated to the deployed AP sees a packet on the air with the Partial_AID in the PHY header, it recognizes the packet as being originated from an AP in the SRG and applies the proper PD thresholds.

For all other competing APs (HT and Legacy), the deployed AP sets the bit in the Partial BSSID bitmap at the position given by the numerical value of the BSSID [39:44]. When an STA receives a Legacy/HT frame it checks the BSSID field in the MAC header and compares it with the bitmap to apply the proper PD thresholds.

At this stage, the deployed AP is setup with the proposed solution and the STAs associated to it will filter out the inter-BSS, intra-BSS and SRG, Non-SRG frames to get better channel access.

Similar to the color selection process described above, conditions that may trigger the process for adding competing co-channel APs to an SRG may include: (i) The deployed AP under consideration is an edge AP, which may be closer to a competing AP; (ii) The channel utilization by competing APs is detected as a very high level of utilization; or (iii) The deployed AP under consideration is provisioned like a root access point (RAP).

Figure 8:
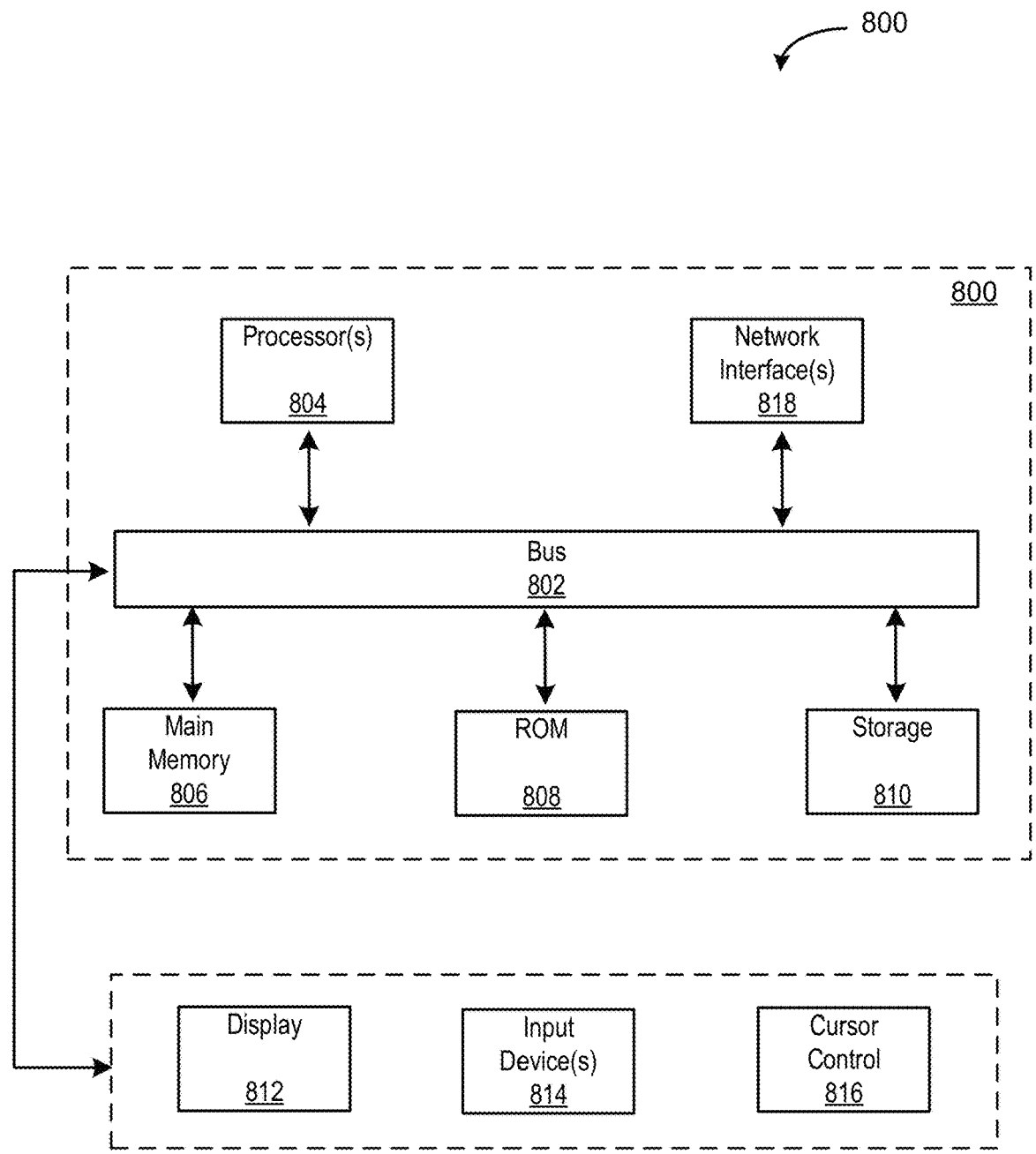
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the machine-readable storage medium comprising instructions to cause the hardware processor to:
    identify a plurality of competing APs of an external wireless network operating on a same channel as a deployed AP of a deployed wireless network;
    examine a received signal strength indicator (RSSI) of each of the identified plurality of competing APs of the external wireless network;
    filter out a selected one or more of the identified plurality of competing APs of the external wireless network based on the RSSIs of each of the selected one or more of the identified plurality of competing APs by removing competing APs outside of an operational range of the deployed wireless network's spatial reuse to arrive at a filtered set of competing APs; and
    augment a spatial reuse group (SRG) of the deployed AP to include the APs in the filtered set of competing APs in the SRG;
    raise SRG-based overlapping BSS (OBSS) minimum and maximum thresholds to a value higher than the maximum threshold for a Non-SRG OBSS power detect (PD) level.

2. The non-transitory machine-readable storage medium of claim 1, wherein raising SRG-based overlapping BSS (OBSS) minimum and maximum thresholds comprises raising an effective minimum threshold required for the deployed AP to detect a packet originating from the competing AP in the external wireless network relative to other deployed APs in the deployed wireless network.

3. The non-transitory machine-readable storage medium of claim 1, wherein raising SRG-based overlapping BSS (OBSS) minimum threshold so that the deployed AP becomes less sensitive to competing APs as compared to other deployed APs within the deployed wireless network.

4. The non-transitory machine-readable storage medium of claim 1, wherein raising SRG-based overlapping BSS (OBSS) minimum threshold increases the capacity of the deployed wireless network.

5. The non-transitory machine-readable storage medium of claim 1, wherein identifying a plurality of competing APs of an external wireless network operating on a same channel as a deployed AP of a deployed wireless network comprises the deployed AP examining beacons on the channel to determine a BSS color of the competing APs.

6. The non-transitory machine-readable storage medium of claim 1, wherein removing competing APs outside of the operational range comprises removing competing APs falling outside of a range from −82 dBm to −62 dBm.

7. The non-transitory machine-readable storage medium of claim 1, further comprising the deployed AP populating an SRG BSS Color Bitmap subfield in a spatial reuse parameter set (SRPS) element.

8. The non-transitory machine-readable storage medium of claim 1, further comprising the deployed AP populating an SRG Partial BSSID Bitmap subfield indicating which Partial BSSID values are used by members of the SRG.

9. A method, comprising:
identifying a plurality of competing APs of an external wireless network operating on a same channel as a deployed AP of a deployed wireless network;
examining a received signal strength indicator (RSSI) of each of the identified plurality of competing APs of the external wireless network;
filtering out a selected one or more of the identified plurality of competing APs of the external wireless network based on the RSSIs of each of the selected one or more of the identified plurality of competing APs by removing competing APs outside of an operational range of the deployed wireless network's spatial reuse to arrive at a filtered set of competing APs; and
augmenting a spatial reuse group (SRG) of the deployed AP to include the APs in the filtered set of competing APs in the SRG;
raising an SRG-based overlapping BSS (OBSS) minimum and maximum thresholds to a value higher than the maximum threshold for a Non-SRG OBSS power detect (PD) level.

10. The method of claim 9, wherein raising SRG-based overlapping BSS (OBSS) minimum and maximum thresholds comprises raising an effective minimum threshold required for the deployed AP to detect a packet originating from the competing AP in the external wireless network relative to other deployed APs in the deployed wireless network.

11. The method of claim 9, wherein raising SRG-based overlapping BSS (OBSS) minimum threshold so that the deployed AP becomes less sensitive to competing APs as compared to other deployed APs within the deployed wireless network.

12. The method of claim 9, wherein raising SRG-based overlapping BSS (OBSS) minimum threshold increases the capacity of the deployed wireless network.

13. The method of claim 9, wherein identifying a plurality of competing APs of an external wireless network operating on a same channel as a deployed AP of a deployed wireless network comprises the deployed AP examining beacons on the channel to determine a BSS color of the competing APs.

14. The method of claim 9, wherein removing competing APs outside of the operational range comprises removing competing APs falling outside of a range from −82 dBm to −62 dBm.

15. The method of claim 9, further comprising the deployed AP populating an SRG BSS Color Bitmap subfield in a spatial reuse parameter set (SRPS) element.

16. The method of claim 9, further comprising the deployed AP populating an SRG Partial BSSID Bitmap subfield indicating which Partial BSSID values are used by members of the SRG.

* * * * *